Figure 1:
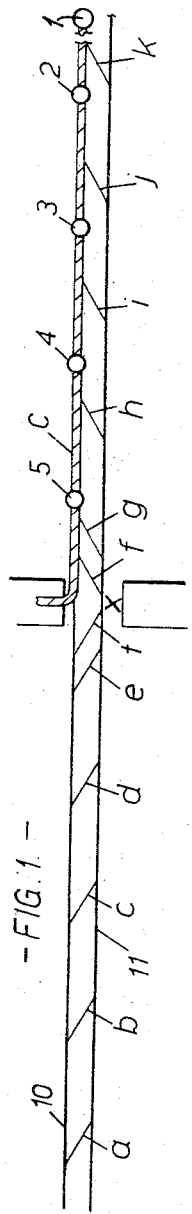
Figure 2:
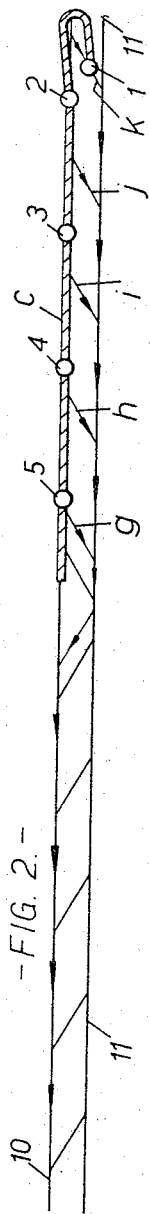

July 4, 1967  T. POLLARD  3,329,097
CABLE AND LIKE HANDLING DEVICES
Filed Nov. 23, 1965  4 Sheets-Sheet 1

INVENTOR:
THOMAS POLLARD

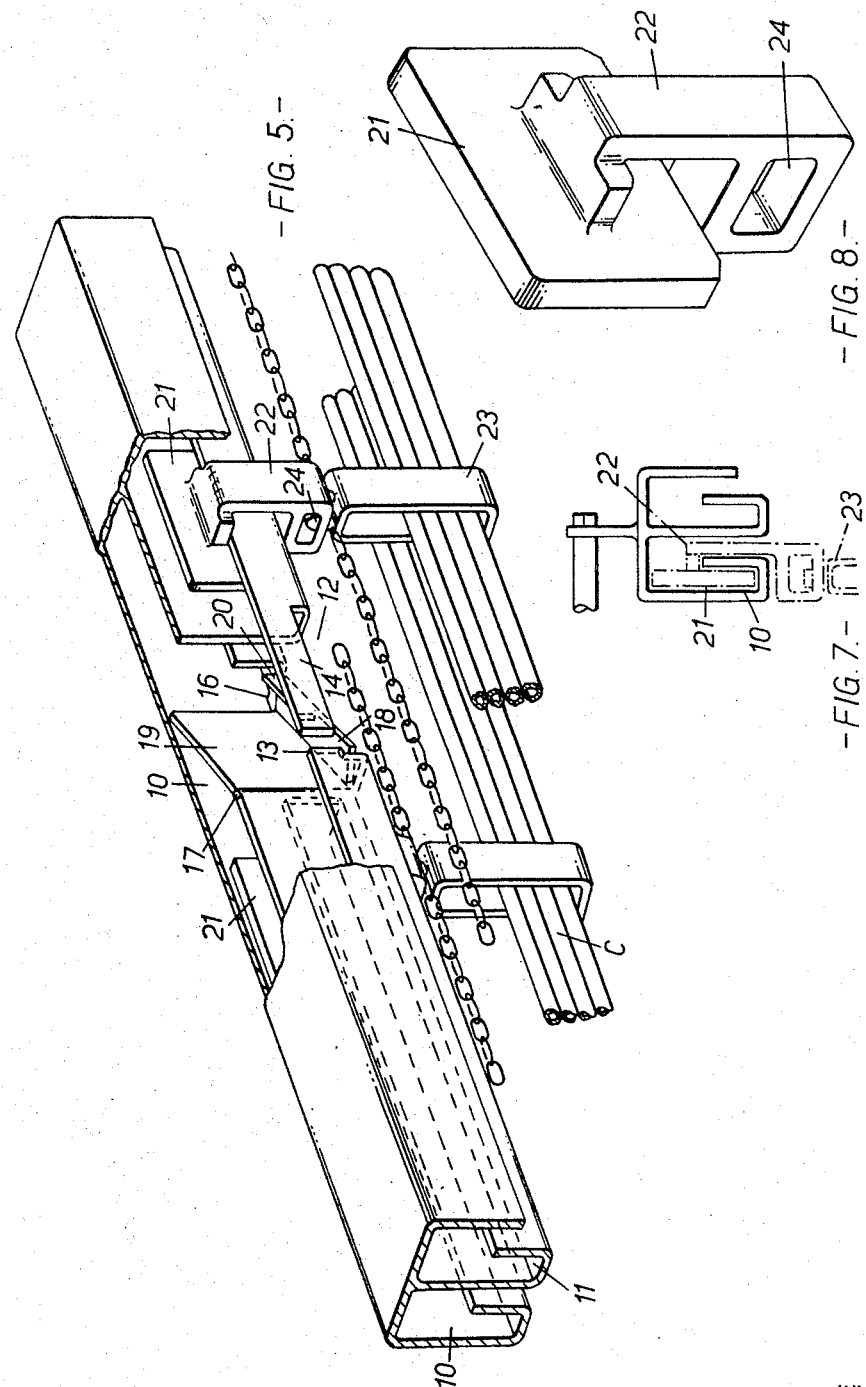

July 4, 1967  T. POLLARD  3,329,097
CABLE AND LIKE HANDLING DEVICES
Filed Nov. 23, 1965  4 Sheets-Sheet 3
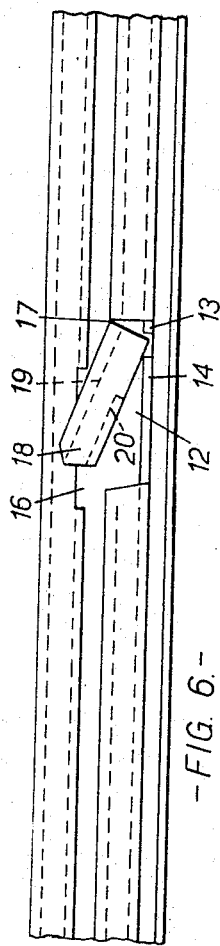
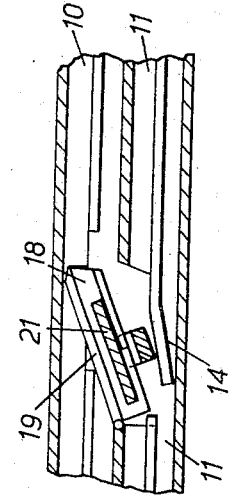
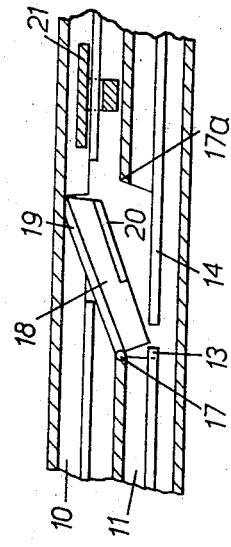
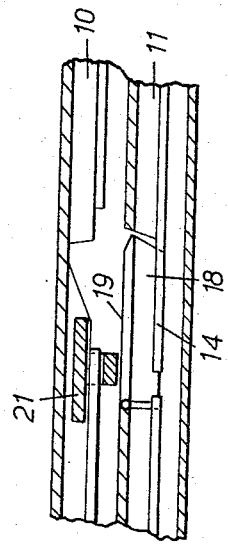
INVENTOR:
THOMAS POLLARD

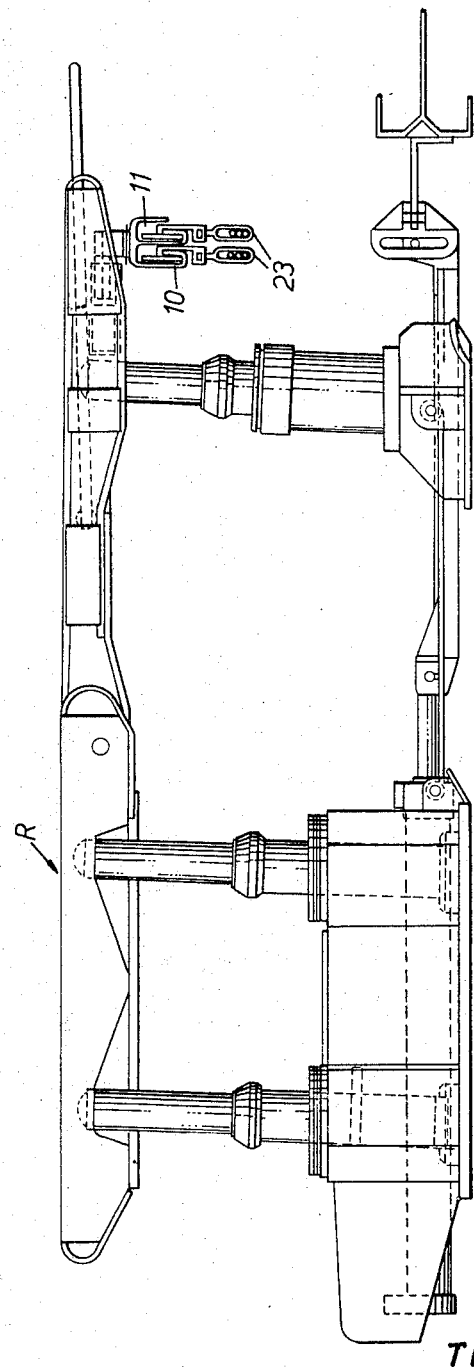

United States Patent Office 3,329,097
Patented July 4, 1967

3,329,097
CABLE AND LIKE HANDLING DEVICES
Thomas Pollard, Chorley, England, assignor to Gullick Limited, Wigan, Lancashire, England, a British company
Filed Nov. 23, 1965, Ser. No. 509,302
Claims priority, application Great Britain, Dec. 3, 1964, 49,125/64
12 Claims. (Cl. 104—195)

This invention is for improvements in or relating to cable service pipe and like handling devices, hereinafter referred to collectively as cable handling devices.

The invention is particularly, although not exclusively concerned with cable handling devices for use in coal mines and like underground workings.

In mechanised mining using longwall methods a coal cutting or like machine is used which traverses the coal face. The cut coal is transported from the face by a conveyor (e.g. a scraper conveyor) which usually extends for the whole length of the face to a point of discharge at the end of the face known as the loader gate. The conveyor is frequently used to guide the cutting machine.

Electric, hydraulic or other power has to be supplied to the moving cutting machine and this is done by service cables or pipes which are usually arranged to lie alongside the conveyor in a manner which enables the cutting machine to drag them from one end of the face to the other.

One object of the present invention is to provide a cable handling device which does not necessitate the roof supports having to be placed further from the face than is desirable, as has been the case with cable handling devices as available heretofore, so as to accommodate the cable or pipes.

A further object of the invention is to provide a cable handling device which does not interfere with the transfer of coal from the cutting machine to the conveyor.

A still further object of the invention is to provide an arrangement which avoids twisting of the cable.

Another object is to provide an arrangement which only requires a cable having half the length of the coal face.

According to the present invention there is provided a cable handling device comprising at least two tracks or guideways, hangers or supports for cables, hose or the like adapted to run in said tracks or guideways and means for causing said hangers or supports as they move in one direction along a part of one track to be transferred to the other track for movement therealong and means for causing the hangers or supports when moved in the opposite direction along a part of said other track to be transfered back onto the first-mentioned track, the arrangement being such that a cable, hose or the like carried by the hangers is looped between those on one track and those on the other.

According to a further feature of the present invention there is provided a cable handling device comprising parallel first and second tracks having a cable entry positioned between their ends, a plurality of cable hangers or supports, a first series of transfer points to the right of said cable entry position each of which is operative in turn to transfer one of said cable hangers or supports from the first track to the second track, a further transfer point to the left of said first series of transfer points and operative to transfer all said hangers or supports back in turn to the first track, a second series of transfer points to the left of said cable entry position each of which is operative in turn to transfer one of said hangers or supports back again to the second track, and a further transfer point to the right of said second series of transfer points and operative to transfer all said hangers back in turn from the second track to the first track whereby the cable hangers or supports travel a figure-8 path having its cross-over in the vicinity of the cable entry position.

With an arrangement as above set forth a machine such as a coal cutting machine, which has to traverse the length of the coal face along which the tracks extend, will have its supply cable, hose or the like neatly paid out and looped in as it moves from one end of the tracks to the other in both directions.

Each hanger may be visualised as travelling in its own somewhat figure-8 path. The nearer a hanger is to the machine the longer will be such path.

The tracks may be combined in a unitary structure of tubular or box-like cross-section (e.g. somewhat like ducting), which can be supported by hangers, brackets or the like from any convenient position (usually on the roof support) so as not to interfere with the function of the supports or of any other machinery or equipment and also so as not to interfere with the free transfer of coal from the cutting machine to the conveyor.

One particular embodiment of the invention will now be described, by way of example, as applied to, for example, a cable handling device for electric cable which supplies power to a coal cutting machine. In the following description reference is made to the accompanying drawings in which:

FIGURES 1, 2, 3 and 4 are longitudinal diagrammatic plan views illustrating the mode of operation of the cable hanger device, FIGURE 5 is a perspective view of a fragment of the cable handling device, FIGURE 6 is an underneath view of a length of track forming part of the device, FIGURE 7 is an end view of the length of track shown in FIGURE 6, FIGURE 8 is a perspective view of one of the cable hangers, FIGURES 9, 10 and 11 are fragmentary sectional plan views showing the different positions elements of the device may occupy at transfer positions in the track, and FIGURE 12 shows how the cable handling device may be supported in an elevated position by mine roof supports.

Broadly, the cable handling device comprises a length of metal ducting shaped in cross-section so as to provide parallel side-by-side tracks 10 and 11 respectively and a plurality of hangers or runners arranged to run or slide in these tracks.

In the drawings (FIGURES 1 to 4) five hangers are shown and these are designated 1, 2, 3, 4 and 5.

At spaced intervals along the length of the track 10, 11 transfer points are provided. In FIGURES 1 to 4 these transfer points are designated a to e and g to k.

It will be noted that the transfer points a to e are inclined opposite-hand to the transfer points g to k.

There are also two special transfer points t and f. The purpose of these transfer points will be more fully explained hereafter.

Each hanger comprises runners 21 and 22 adapted to slide in the track 10 or the track 11. The cable C is attached to the hangers by swivel devices 23 pivotally attached to the hangers at 24.

One of the transfer points k to g will now be described in detail with reference to FIGURES 5 and 6 and 9 to 11 of the drawings.

At this transfer point a portion of the track 11 is cut away as indicated at 12 except for portions 13 and 14. The portion 14 is flexible and may be formed by replacing a portion of the cutaway flange by a piece of spring steel strip or the like.

Also at the transfer point a portion of the other track 10 is cut away as indicated at 16.

Pivotally supported at 17 in the cutaway portions 12 and 16 of the tracks 11 and 10 is a transfer or "points" member 18 having flanges 19 and 20. The transfer member is biased by a spring (not shown) into an inclined position across the tracks 10 and 11 as shown in FIGURES 6, 9 and 10, so that it will transfer a hanger from the track 10 to the track 11 when said hanger is moving to the left in the section of the cable handling device comprising the transfer points g to k.

More particularly, as a hanger comes to its transfer point (FIGURE 9 shows a hanger just approaching its transfer point), its runner 21 will pass into and slide along the transfer member 18 and its part 11 will deflect the flexible portion 14 of the track 11 (see FIGURE 10). From the position shown in FIGURE 10 the hanger will pass into the track 11 following which the resilient part 14 of the track 11 will be permitted to spring back into its normal position as shown in FIGURE 9.

When a hanger is travelling to the right along the portion of the track 10 having the transfer points g to k it will deflect the transfer members 18 of said transfer points to the position shown in FIGURE 11 so that no transfer of a hanger from one track to the other takes place.

The transfer point t is similar in construction to the transfer point described with reference to FIGURES 5 and 6 and FIGURES 9, 10 and 11 except that its transfer member 18 is pivoted and arranged so that it will transfer the hangers as they approach it from the track 11 of the section having the transfer points g to k, to the track 10 of the section of the cable handling device having the transfer points a to e.

The transfer points a to e are also similar to the transfer point above described with reference to FIGURES 5 and 6 and FIGURES 9 to 11 except that they are of opposite hand, i.e. the transfer member 18 will be pivoted and arranged so as to transfer a hanger from the track 10 to the track 11 when said hanger is moving to the right along the section of the cable handling device having the transfer points a to e.

The transfer point f is also similar in construction to the transfer point described with reference to FIGURES 5 and 6 and FIGURES 9 to 11 except that its transfer member 18 is pivoted and arranged so that it will transfer the hangers from the track 11 of the section of the device comprising the transfer points a to e to the track 10 of the section of the device having the transfer points g to k.

The ducting comprising the tracks 10, 11 is supported by means of hangers 25 from any convenient position but so that the track, hangers and cable will not interfere with movement of any of the machinery or equipment in the mine or with the loading of the cut coal onto the conveyor. A particularly convenient and suitable mounting for the cable handling device is the forward parts of the roof bars of the mine roof support R as shown in FIGURE 12.

The hangers may be connected together and to the machine by a chain 26 to relieve tension on the cables.

It is important that the spacing of the transfer points a, b, c, d etc. should be less than the spacing of the cable hangers along the cable so that at no time will there be more than one hanger between two transfer points.

The cable handling device just described operates as follows:

Assuming (see FIGURES 1 to 4) that the length of ducting comprising the tracks 10 and 11 is equal to that of the coal face then the cable C enters the ducting at a point X half-way along the length thereof and extends along one half of the track so that the last hanger, from which the supply is taken to the machine, is just beyond the last transfer point.

Figure 3:
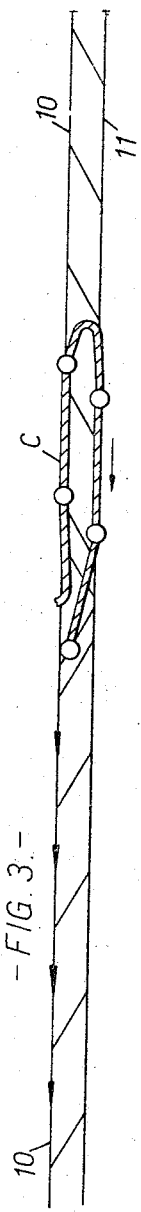

Also assuming, for purposes of illustration, that transfer point k is the last transfer point, although, of course, in practice there will be very many more transfer points and hangers than is shown in FIGURES 1 to 4, as the machine moves to the left the hanger 1 will travel along the track 10 until it comes to the transfer point k whereupon it will be transferred (see FIGURE 2) to the track 11. Similarly, when the hanger 2 comes to its transfer point j it in turn will be transferred to the track 11 as shown in FIGURE 3.

Figure 4:
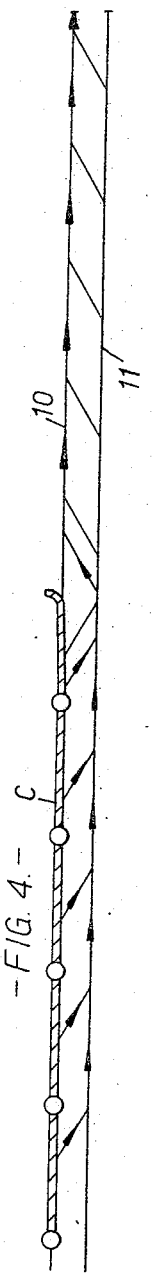

As each of the hangers passes point X it is transferred, via the transfer point t to the left hand part of the track 10, so that when the machine reaches the extreme left hand end of its journey the condition of the cable handler is as shown in FIGURE 4. On the return journey of the machine the hanger 1 is transferred to the track 11 via transfer point a, hanger 2 via transfer point b and so on until as each hanger passes point X it is transferred, via transfer point f back onto track 10 so that conditions will again become as shown in FIGURE 1.

It will be noted that transferring of the hangers individually only takes place when the machine travels towards point X, the hangers remaining in the same track (track 10) when the machine travels from point X outwards.

Each cable hanger can be visualised as moving in its own somewhat figure-8 path. The further a hanger is along the length of the cable the longer will be its figure-8 path. In the arrangement shown in FIGURES 1 to 4 the hanger 1 will have the longest path, the hanger 2 the next longest and so on, the hanger 5 having the shortest path.

With the above described arrangement the cable is neatly looped up and paid out as the machine moves from one end of the track to the other. Furthermore, the cable is not twisted, at least to any material extent, and its length is only approximately half that the coal face.

I claim:

1. A cable handling device comprising at least two guideway-tracks, hangers for cable positioned in said tracks for movement therealong, transfer means for causing said hangers as they move in one direction along a part of one track to be transferred to the other track for movement therealong and transfer means for causing the hangers when moved in the opposite direction along a part of said other track to be transferred back onto the first-mentioned track whereby a cable carried by the hangers is looped between those on one track and those on the other.

2. A cable handling device comprising parallel first and second guideway-tracks having a cable entry positioned between their ends, a plurality of cable hangers positioned in said guideway-tracks for movement therealong, a first series of transfer points to the right of said cable entry position each of which is operative in turn to transfer one of said cable hangers from the first track to the second track, a further transfer point to the left of said first series of transfer points and operative to transfer all said hangers back in turn to the first track, a second series of transfer points to the left of said cable entry position each of which is operative in turn to transfer one of said hangers back again to the second track, and a further transfer point to the right of said second series of transfer points and operative to transfer all said hangers back in turn from the second track to the first track whereby the cable hangers travel a figure-8 path having its crossover in the vicinity of the cable entry position.

3. A cable handling device as claimed in claim 2 wherein the length of said figure-8 path is longer for a hanger the further the hanger is along the cable.

4. A cable handling device as claimed in claim 1 wherein the guideway-tracks are combined in a unitary structure of tubular cross-section.

5. A cable handling device as claimed in claim 1 wherein each guideway-track is a double track and the hangers have parts to run in said double tracks.

6. A cable handling device as claimed in claim 2 wherein at each transfer point there is a communicating gap between the two guideway-tracks and a transfer member positioned and operative to cause a hanger, when moving along a track in one direction, to be transferred to the other track but to permit a hanger moving in the other direction to pass it and remain in the one track.

7. A cable handling device as claimed in claim 6 wherein the transfer member is pivotally supported and has biasing means to bias it into a position for transferring a hanger from one track to the other.

8. A cable handling device as claimed in claim 5 wherein at each transfer means a central web between the two tracks of each double track has a flexible part which is deflected laterally to permit a hanger to pass from one guideway-track to the other.

9. A cable handling device as claimed in claim 1 wherein the hangers have swivel devices attached to them which swivel devices carry the cable.

10. A cable handling device as claimed in claim 1 wherein the hangers have flexible means connecting them together.

11. A cable handling device as claimed in claim 1 wherein the guideway-tracks are mounted on the forward parts of mine roof supports and the cable handling device serves for handling cable for machinery which travels along a coal face.

12. A cable handling device as claimed in claim 2 wherein the guideway-tracks are mounted on the forward parts of mine roof supports and the device serves for handling cable for machinery which travels along the coal face.

No references cited.

ARTHUR L. LA POINT, *Primary Examiner.*

D. F. WORTH, *Assistant Examiner.*